Figure 3:
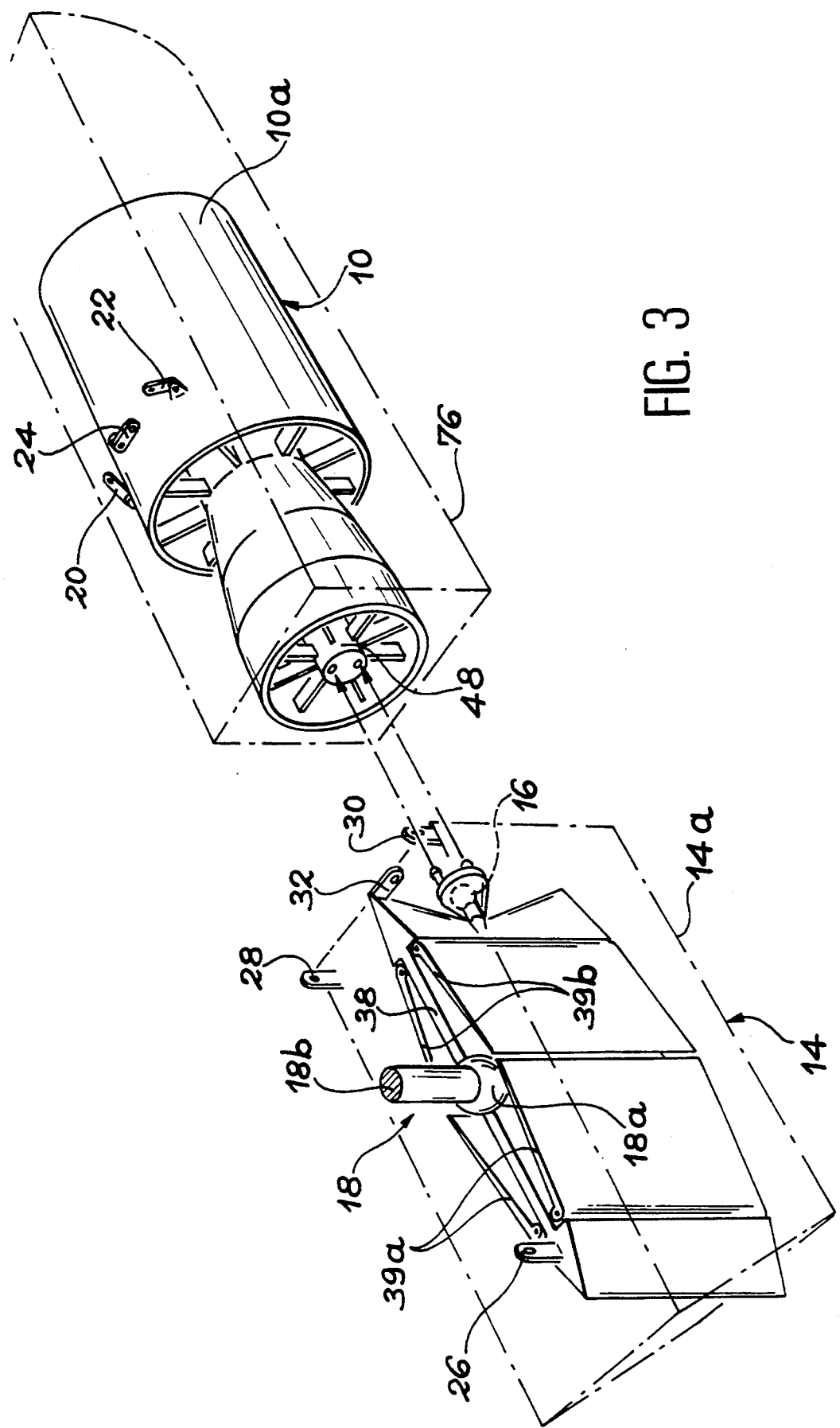

United States Patent [19]

Durand

[11] Patent Number: 5,447,282

[45] Date of Patent: Sep. 5, 1995

[54] DEVICE FOR ATTACHING A TURBOJET ENGINE TO AN AIRCRAFT STRUCTURE

[75] Inventor: Yves Durand, Aussonne, France

[73] Assignee: Societe Nationale Industrielle et Aerospatiale des Poudres et Explosifs, Paris Cedex, France

[21] Appl. No.: 102,560

[22] Filed: Aug. 5, 1993

[30] Foreign Application Priority Data

Aug. 6, 1992 [FR] France .................. 92 09777

[51] Int. Cl.$^6$ .................................. B64D 27/00
[52] U.S. Cl. ........................... 244/54; 244/53 B
[58] Field of Search ............ 244/53 B, 54; 60/39.31; 137/15.1, 15.2

[56] References Cited

U.S. PATENT DOCUMENTS

| 2,604,278 | 7/1952 | Johnson . | |
|---|---|---|---|
| 4,022,018 | 5/1977 | Tuten et al. | 60/39.31 |
| 4,037,404 | 7/1977 | Bougain | 60/39.31 |
| 4,065,077 | 12/1977 | Brooks | 60/39.31 |
| 4,079,981 | 3/1978 | Mahla et al. | 244/54 |
| 4,361,296 | 11/1982 | Hall et al. | 60/39.31 |
| 4,717,094 | 1/1988 | Chee | 244/54 |
| 5,176,339 | 1/1993 | Schmidt | 244/54 |
| 5,238,206 | 8/1993 | Pachomoff | 244/54 |

FOREIGN PATENT DOCUMENTS 1015162 11/1965 United Kingdom .
1302228 1/1973 United Kingdom .

Primary Examiner—Galen L. Barefoot
Attorney, Agent, or Firm—Michael N. Meller

[57] ABSTRACT

For bringing about the attachment of a turbojet engine (10) to an aircraft structure such as a wing (12), use is made of a non-rotary, front, central body of the engine, which is connected by a ball joint (16) to a thrust transmission member such as an air intake (14), which is itself connected to the wing (12) by a thrust transmitting system (18). In this way, the thrust (X) of the turbojet engine is transmitted to the air intake (14) along the engine longitudinal axis before being transmitted to the aircraft structure by the system (18). Therefore the casings and lines of shafts of the turbojet engine are not exposed to any bending moment, which makes it possible to optimize the performance characteristics of said engine. Moreover, it is still possible to deform the wing (12) without any risk of surging or hunting of the turbojet engine.

10 Claims, 4 Drawing Sheets

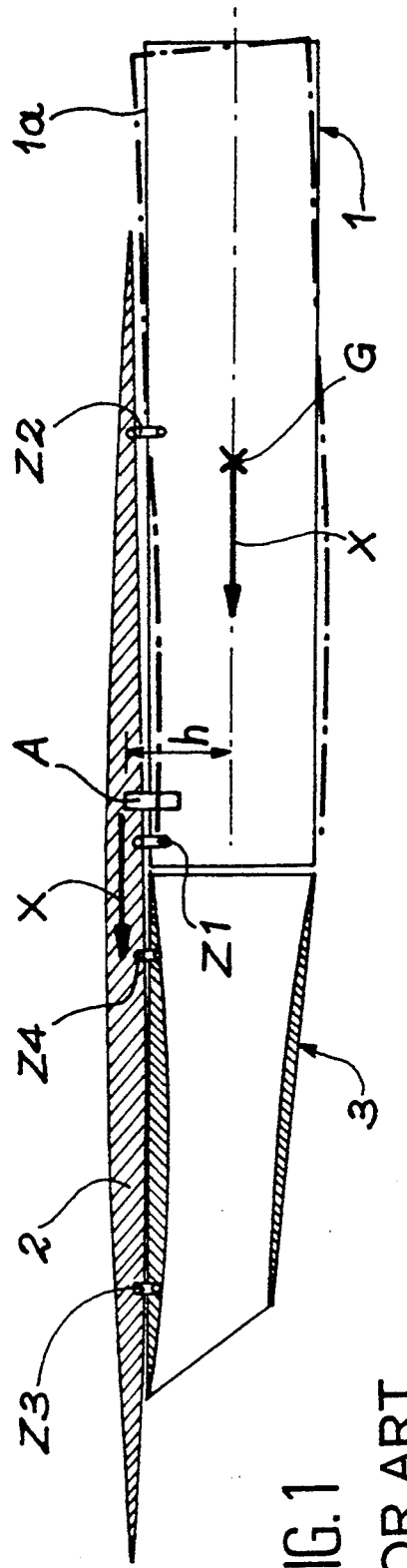
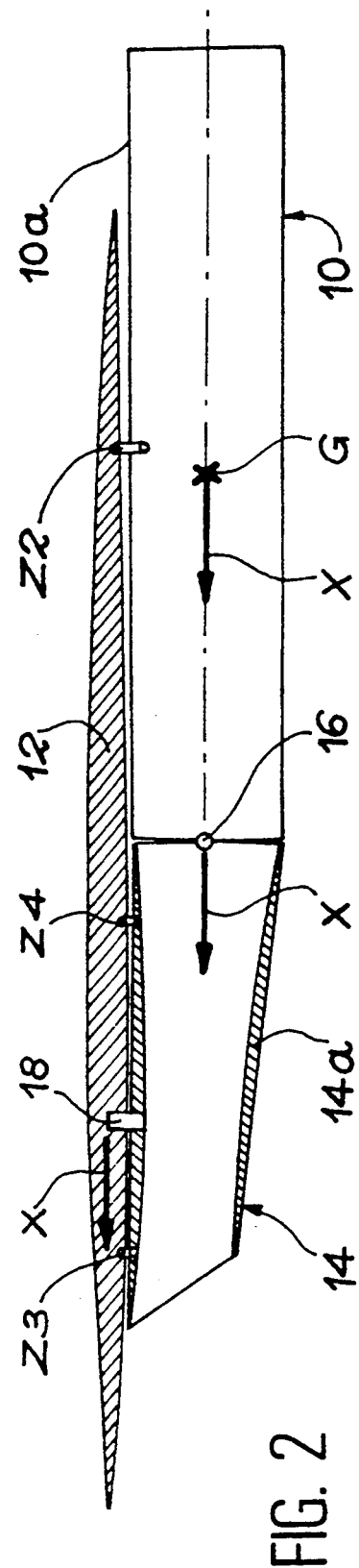
FIG. 1 PRIOR ART
FIG. 2

DEVICE FOR ATTACHING A TURBOJET ENGINE TO AN AIRCRAFT STRUCTURE

The invention relates to a device designed for attaching a turbojet engine having a front, central, non-rotary body to a structure such as an aircraft wing.

Although it can be used on all aircraft types, the attachment device according to the invention leads to particularly marked advantages when used on supersonic aircraft.

As is diagrammatically illustrated by the side view of FIG. 1, the attachment of a turbojet engine 1 to an aircraft wing 2 is conventionally carried out by devices entirely installed between the outer casing 1a of the engine 1 and the wing 2. More specifically, the suspension of a turbojet engine 1 on an aircraft wing 2 is conventionally brought about by two groups of substantially vertical ball joint-equipped shackles, articulated to the outer frame of the engine at location $Z_1$ and $Z_2$, respectively in the vicinity of the front end of the engine and to the rear of its centre of gravity G.

Moreover, the transmission of the thrust X of the turbojet engine to the wing 2 takes place at a location A slightly to the rear of the location $Z_1$, but well to the front of the centre of gravity G. As a function of the particular case, said transmission can be ensured either by a horizontal ball joint installed in the central, upper part of the outer casing of the turbojet engine 1 and which is penetrated by a vertical shaft integral with the wing 2, or by two oblique rods, whose ends are respectively articulated to the wing 2 and on either side of the engine casing 1a.

When an air intake 3 is placed upstream of the turbojet engine 1, as in diagrammatically shown in FIG. 1, said air intake is also connected to the wing 2 et two locations $Z_3$ and $Z_4$ which are axially remote from one another by means of two groups of substantially vertical ball joint-equipped shackles. These suspension devices for the turbojet engine 1 and the air intake 3 are normally completed by one or more substantially horizontal ball joint-equipped shackles, e.g. located at $Z_2$ and $Z_4$.

As is very clearly illustrated in FIG. 1, the transmission of the thrust X to the wing 2 (location A) across the outer casing 1a of the turbojet engine 1 leads to the application to said casing 1a of a bending moment equal to the product of the thrust X by the distance h separating the longitudinal axis of the engine 1 from the point of the wing 2 by which the thrust is applied to the latter. This bending moment leads to deformations of the outer casing 1a, which must be taken into account by the engine designer during the calculation of the clearance between the ends of the not shown rotor blades and the outer casing 1a. Moreover, the existence of this bending moment makes it necessary to give to said clearance a relatively large minimum value, which does not permit the best possible optimization of the engine performance characteristics.

In addition, the wing of an aircraft must be able to freely deform during flight, particularly when it is highly tapered and very flexible, as is the case with a supersonic aircraft wing. When conventional attachment devices are used, the turbojet engines 1 equipped with their air intakes 3 tend, as a result of their stiffness, to induce over-stressing, which opposes the free deformation of the wing.

in the case of existing aircraft, the latter disadvantage has been partly obviated by eliminating any connection between the turbojet engine 1 and its air intake 3 and by attaching said two means independently of one another to the wing 2 in the manner illustrated in FIG. 1. However, this solution does not eliminate the problem caused by the bending moment induced by the transmission of the thrust to the wing through the outer casing of the engine. Moreover, the absence of any connection between the latter and its air intake means that the clearance existing between said two means is only limited by the bending of the wing. Therefore engine hunting risks can occur if said clearance exceeds a certain value. It is necessary to have a movement joint connecting the rear face of the air intake and the front face of the engine.

The present invention is directed at a device making it possible to transmit to an aircraft structure such as a wing the thrust of a turbojet engine without passing via its outer casing and in such a way that no bending moment is induced in said casing (which makes it possible to optimize the performance characteristics of the turbojet engine by giving a minimum value to the clearance between the rotor blades and the outer casing) and the structure of the aircraft can freely deform, without leading to any hunting risk on the part of the engine by means of fitting a gasket, whose only function is to maintain the continuity of the air stream or jet.

According to the invention, this result is obtained by means of a device for attaching a turbojet engine to the front, central, non-rotary body on an aircraft structure, characterized in that it comprises a thrust transmission member attached to said structure to the front of the turbojet engine and separately from the latter, and a thrust transmission ball joint connecting a front end of the central body to the thrust transmission member in accordance with a longitudinal axis of the turbojet engine.

Apart from the results referred to hereinbefore, such an attachment device makes it possible to eliminate all the elements connecting the front part of the outer casing of the turbojet engine to the wing in known attachment devices. The resulting space available makes it possible to install in a more compact manner the surrounding systems and accessories.

In a preferred embodiment of the invention, the thrust transmission member is an air intake having an outer casing connected to said ball joint by a rigid structure and connected to the aircraft structure by thrust transmission means.

The thrust transmission means advantageously incorporate a horizontal ball joint mounted in a central, upper part of the outer casing of the air intake and traversed by a bore, which receives a shaft integral with the aircraft structure.

The outer casing of the air intake can in particular be connected to the aircraft structure, in the same radial plane of the air intake close to the turbojet engine by means of two substantially vertical ball joint-equipped shackles and by one substantially horizontal ball joint-equipped shackle and, in the vicinity of a front end of the air intake, by a substantially vertical ball joint-equipped shackle.

In a comparable manner, the outer casing of the turbojet engine can be directly connected to the aircraft structure, in the same radial plane of the engine, by two substantially vertical ball joint-equipped shackles and by one substantially horizontal ball joint-equipped shackle. It should be noted that these shackles have as their only function the suspension of the turbojet engine on the aircraft structure and do not participate in the transmission to said structure of the engine thrust.

To facilitate the removal of the turbojet engine and, if necessary, the air intake, disconnectable connecting means are advantageously associated with the ball joint between the front end of the central body of the engine and the thrust transmission member. These disconnectable connecting means more particularly incorporate dog clutch means interposed between the ball joint and the front end of the central body of the turbojet engine. Means for locking said dog clutch means in a connected state are also provided.

In order to facilitate connection, translation means are provided for the displacement of the ball joint along an axis substantially aligned with the longitudinal axis of the turbojet engine, between an assembly position and a disassembly position. In the assembly position, the maximum clearance which can exist between the outer casing of the air intake and the outer casing of the engine must in no case exceed a predetermined value. Therefore there is no risk of hunting on the part of the turbojet engine and the design of the air stream gasket is facilitated.

In addition, an unlockable system prevents an actuation of the translation means when they occupy their assembly position.

The invention is described in greater detail hereinafter relative to a non-limitative embodiment and with reference to the attached drawings, wherein show:

FIG. 1 Already described, a part sectional side view illustrating in a highly diagrammatic manner the attachment of a turbojet engine beneath the wing of an aircraft using known procedures.

FIG. 2 A view comparable to FIG. 1 illustrating the attachment of a turbojet engine beneath the wing of an aircraft with the aid of an attachment device according to the invention.

FIG. 3 A perspective view showing in greater detail a turbojet engine and its air intake and stressing the members by which said two means are suspended on the wing and by which the engine thrust is transmitted to the wing.

Figure 4:
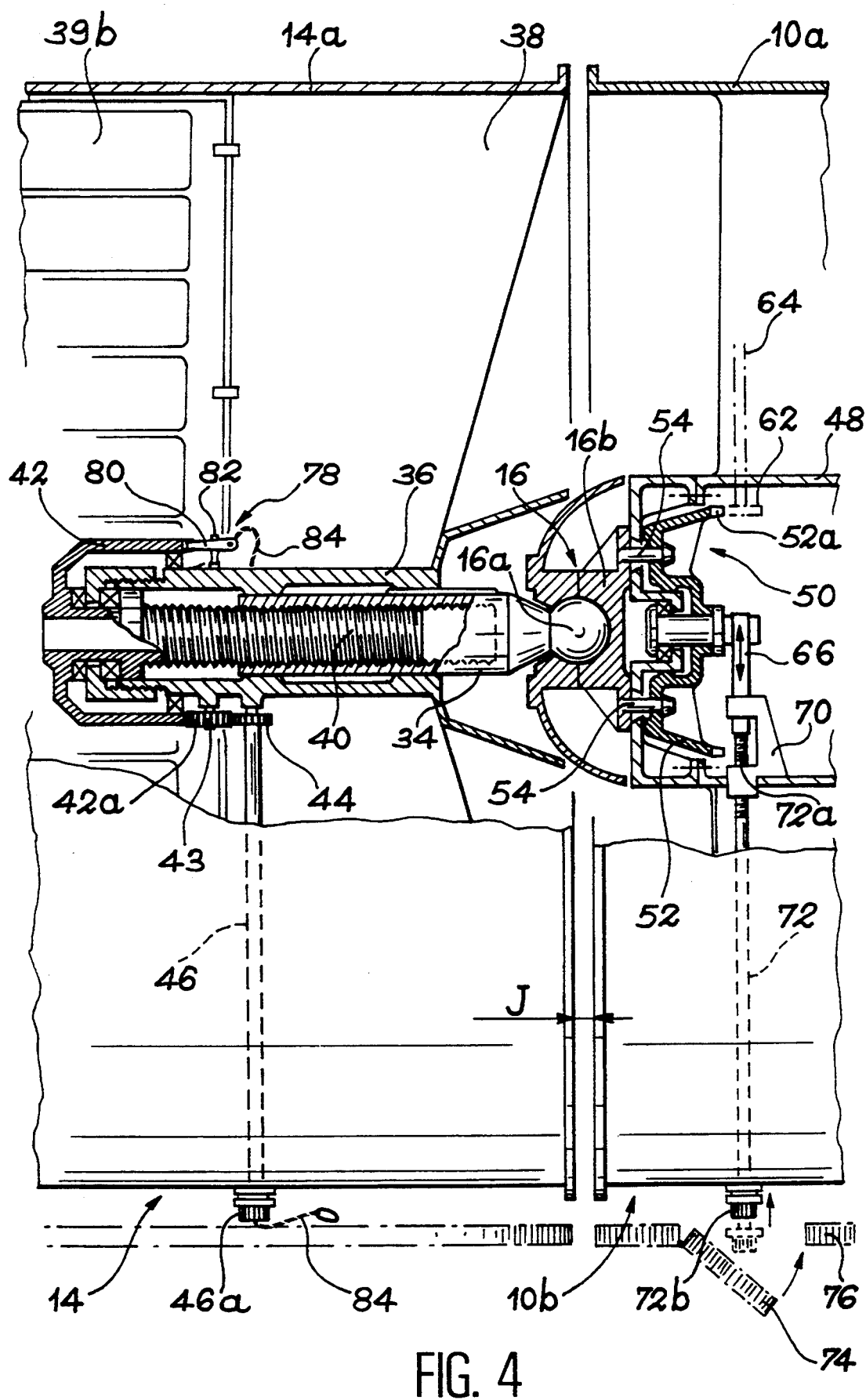

FIG. 4 A longitudinal sectional view in accordance with a vertical plane showing in greater detail the ball joint for transmitting the turbojet engine thrust through the air intake structure, as well as the mechanisms facilitating the separate removal of the engine and the intake.

Figure 5:
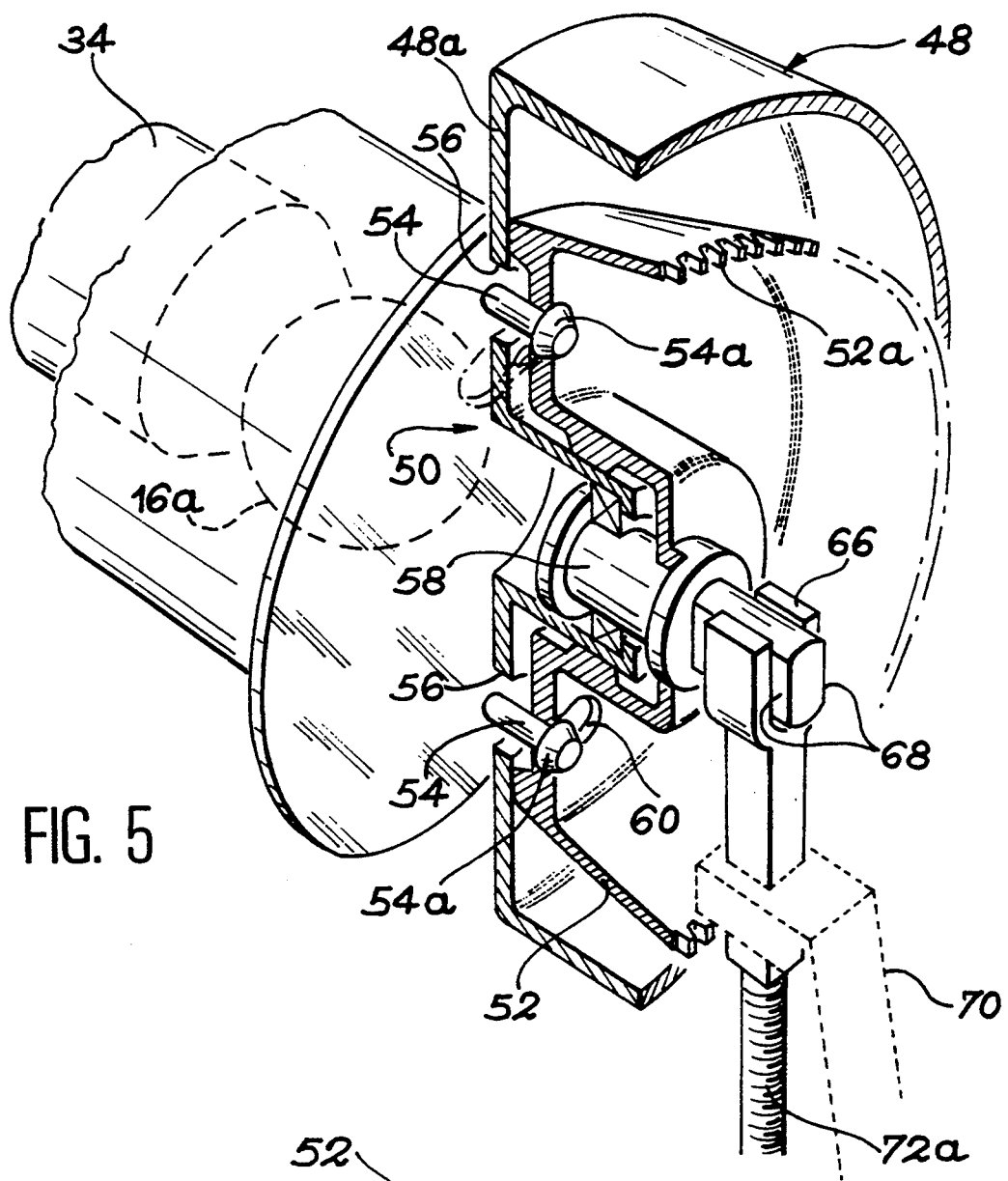

FIG. 5 A perspective, part sectional view showing in greater detail the dog clutch means normally connecting the rear part of the air intake and the front part of the turbojet engine.

Figure 6:
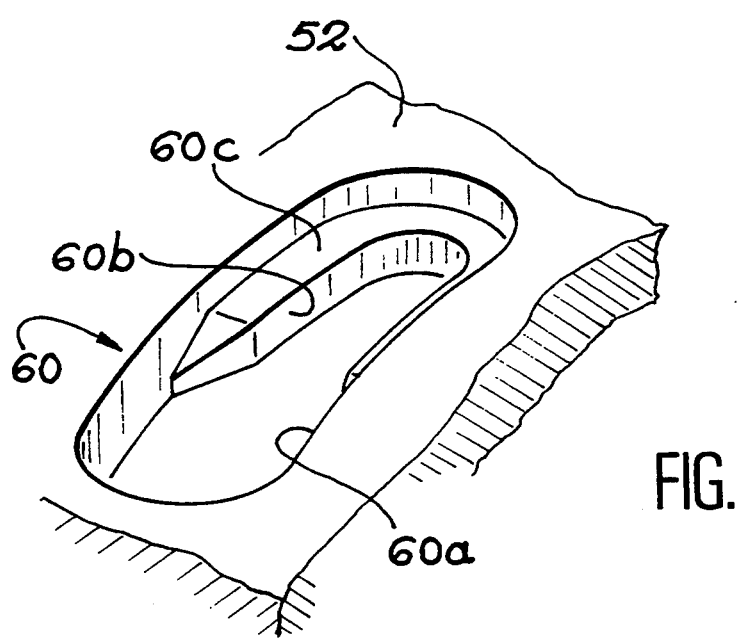

FIG. 6 A perspective view illustrating on a larger scale part of the dog clutch means making it possible to ensure the separate removal of the turbojet engine and the air intake.

As is very diagrammatically illustrated in FIG. 2, the attachment of a turbojet engine 10 below the wing 12 of an aircraft takes place, according to the invention, in such a way that the thrust X which is exerted on the centre of gravity G of the engine in accordance with its longitudinal axis is transmitted along said longitudinal axis to a thrust transmission member in this case constituted by an air intake 14 positioned upstream of the engine before being transmitted to the wing 12.

More specifically, the turbojet engine has in this case a front, central, non-rotary body 48 (FIGS. 3 to 5), whose front end is connected to the air intake 14 by a thrust transmission ball joint 16. The turbojet engine thrust X is transmitted to the air intake 14 by the ball joint 16 in accordance with the engine axis, before being transmitted from the air intake 14 to the wing 12 by thrust transmission means 18. As illustrated in FIG. 3, said thrust transmission means 18 e.g. incorporate a horizontal ball joint 18a mounted in a central, upper part of the outer casing 14a of the air intake 14, as well as a vertical shaft 18b integral with the wing 12 and penetrating a substantially vertical bore formed in the horizontal ball joint 18a.

As a result of this arrangement, no bending moment is induced in the turbojet engine 10 by the thrust X, so that the clearance between the ends of the rotor blades of the engine and its outer casing can be significantly reduced compared with the prior art attachment devices, in order to optimize the engine performance characteristics.

Moreover, the ball joint 16 forms between the air intake 14 and the turbojet engine 10 a connection allowing a substantially free deformation of the wing 12, whilst limiting to a maximum known value the clearance which can exist between the air intake and the engine. The hunting risks of said engine are consequently minimized.

Apart from the elements already described and which relate to the transmission of thrust forces between the turbojet engine 10 and the wing 12, the attachment device according to the invention comprises a certain number of ball joint-equipped shackles located at a location $Z_2$ (FIG. 2) slightly to the rear of the centre of gravity G with respect to the engine 10 and at location $Z_3$ and $Z_4$ in the vicinity of the front and rear ends of the air intake 14 with respect to the latter. The arrangement of these ball joint-equipped shackles will now be described in greater detail relative to FIG. 3.

With regards to the ball joint-equipped shackles at location $Z_2$, they incorporate two substantially vertical ball joint-equipped shackles 20, 22 arranged substantially symmetrically with respect to a vertical plane passing through the longitudinal axis of the turbojet engine. The upper ends of the shackles 20, 22 are attached by means of ball joints beneath the wing 12, whilst their lower ends are attached by ball joints to the outer casing 10a of the turbojet engine 10. Between these substantially vertical ball joint-equipped shackles 20, 22 is provided a substantially horizontal ball joint-equipped shackle 24, whereof one end is connected by a ball joint to the wing 12 and whereof the opposite end is connected by another ball joint to the upper part of the outer casing 10a. It should be noted that the three shackles 20, 22 and 24 constitute the only direct connection between the outer casing 10a of the turbojet engine 10 and the wing 12 and that they do not participate in the transmission of the thrust forces.

With regards to the connections between the air intake 14 and the wing 12, they have at the location $Z_3$ a single substantially vertical ball joint-equipped shackle 26, whose upper end is attached by a ball joint beneath the wing 12 and whose lower end is connected by a ball joint to the upper part of the outer casing 14a of the air intake 14.

Finally, at the location $Z_4$, the connection between the outer casing 14a of the air intake 14 and the wing 12 has two substantially vertical ball joint-equipped shackles 28, 30 at symmetrical locations with respect to a vertical plane passing through the longitudinal axis of the air intake, as well as a substantially horizontal ball joint-equipped shackle 22 positioned between the ball joint-equipped shackles 28 and 30.

More specifically, the upper ends of the substantially vertical ball joint-equipped shackles 28, 30 are attached beneath the wing 12 by ball joints and the lower ends of said same shackles are connected to the outer casing 14a of the air intake 14 by ball joints. The substantially horizontal ball joint-equipped shackle 32 is also connected by its ends, via two ball joints, respectively to the wing 12 and to the upper part of the outer casing 14a.

In the embodiment illustrated in FIG. 3, the air intake 14 comprises, within the outer casing 14a, a vertical partition 38 passing through the longitudinal axis of the air intake and fixed to the casing. Mobile ramps 39a, 39b are articulated by spindles in the vicinity of the front and rear ends of the partition 38, in order to form within the casing 14a a regulatable neck, convergent—divergent air outflow nozzle.

A description will now be given of the disconnectable connecting means associated with the thrust transmission ball joint 18, so as to permit a separate disassembly of the turbojet engine 10 and/or the air intake 14 during maintenance operations and this takes place relative to FIGS. 4 to 6.

The thrust transmission ball joint 16 has a male part 16a, which is fixed to the rear end of a nut 34, which is to be aligned with the longitudinal axis of the turbojet engine 10. This nut 34 is slidingly received in a support sleeve 36 defining the longitudinal axis of the air intake 14 and which is connected to its outer casing 14a by the vertical partition 38. The fitting of the nut 34 in the sleeve 36 is such that the nut can slide axially in the sleeve, whilst being immobilized in rotation.

A threaded rod 40 is screwed into the nut 34 and, on the side opposite to the ball joint 16, is integral with a chamber 42, whose edge is provided with a tooth system 42a. On said tooth system 42a is meshed a pinion 43, whose radially oriented spindle is supported by the sleeve 36. A pinion 44 fixed to the end of a control rod 46 supported by the partition 38 and which is radially oriented is itself meshed on the pinion 43. One end 46a of the control rod 46 located to the exterior of the casing 14a makes it possible to control the translation of the ball joint 16 between an assembly position and a disassembly position. In the assembly position of the ball joint 16 illustrated in FIG. 1, between the outer casing 14a of the air intake 14 and the outer casing 10a of the turbojet engine 10, there is a limited axial clearance J when said two casings are aligned. A deformation of the wing on which are separately suspended the air intake and the engine can consequently only produce a maximum clearance equal to twice the clearance J and which is inadequate for bringing about a hunting action of the engine in the presence of the not shown gasket maintaining the continuity of the air stream.

Preferably, an axial displacement of the ball joint 16 on moving away from its assembly position illustrated in FIG. 4 is normally prevented by a security system diagrammatically illustrated at 78. This security system 78 comprises a ratchet 80 articulated to the support sleeve 36 by a radial spindle 82. The ratchet 80 is normally engaged on a ratchet wheel integral with the chamber 42 or the threaded rod 40. This ratchet wheel can in particular be constituted by the tooth system 42a. The ratchet 80 can be moved away from the ratchet wheel by exerting a traction on a cable 84 accessible from the outside of the casing 14a and e.g. travelling within the control shaft 46, which is then a hollow shaft.

When the ball joint 16 occupies its disassembly position, it is displaced rearwards, i.e. to the right on considering FIG. 4 over a predetermined distance, so as to facilitate the fitting of the dog clutch means 50 provided between the ball joint 16 and the front end of the front, central, non-rotary body 48 of the turbojet engine 10. These dog clutch means will be described in greater detail relative to FIGS. 4 to 6.

The dog clutch means 50 are provided between a female part 16b of the thrust transmission ball joint 16 and a rotary plate 52 fitted in the front, central body 48, so as to be able to rotate about the longitudinal axis of the engine 10.

More specifically, the female part 16b of the thrust transmission ball joint 16 carries on its rear face turned towards the engine at least two dog clutch pins 54 projecting parallel to the axis of the guide sleeve 36 at diametrically opposite locations with respect to said axis. Each of the pins 54 is terminated by a bearing collar 54a (FIG. 5).

The dog clutch pins 54 and their end collars 54a freely traverse circular arc-shaped openings 56 formed in a wall 48a constituting the front face of the central body 48. In its central part, said wall 48a supports in rotary manner a spindle 58, disposed along the geometrical axis of the turbojet engine 10 and to which is fixed the rotary plate 52.

The rotary plate 52 is positioned immediately behind the wall 48a and has in front of the circular arc-shaped openings 56 dog clutch slots 60, whereof one is shown in detail in FIG. 6. Each of the slots 60 is a circular arc-shaped slot centred on the geometrical axis of the engine and having a wide end 60 able to traverse the end collar 54a of the corresponding dog clutch pin 54, as well as a less wide end 60b authorizing the passage of the pins 54, whilst preventing the passage of their end collars 54a.

As a result of the arrangement which has just been described, the air intake 14 and the turbojet engine 10 can be joined or separated from one another by axial displacement when the dog clutch pins 54 face the wider ends 60a of the dog clutch slots 60, whilst any relative axial movement between the two means is impossible when the pins 54 traverse the less wide ends 60b of the said slots. In the latter case, the end collars 54a of the dog clutch pins bear against the surfaces 60c of the plate 52 adjacent to the less wide ends 60b of the dog clutch slots.

The switching of the dog clutch means 50 between the first position allowing the separation of the air intake 14 and the turbojet engine 10 and the second position ensuring the joining together of said two means is carried out by rotating the plate 52. For controlling said rotation, the plate 52 has a toothed ring or rim 52a on which is engaged at least one pinion 62 (FIG. 4) fixed to the end of a control shaft 64 of the dog clutch means 50. The control shaft 64 extends radially between the front, central body 48 and the outer casing 10a of the turbojet engine 10, so that it can be rotated from the outside of the casing 10a by a simple tool (standard box spanner). Two diametrically opposite and horizontally oriented control shafts 64 can be provided, each of the said shafts carrying at its end a pinion 62 engaged on the toothed ring 52a.

In order to avoid an accidental disengagement of the dog clutch means 50, locking or blocking means are associated with the latter in order to normally maintain the same in a connected state corresponding to the joining together of the air intake 14 and the engine 10.

As is more particularly illustrated by FIGS. 4 and 5, said locking means comprise a fork arm 66 fitted in the front, central body 48 so as to be able to move in a radial direction between an outer position authorizing an actuation of the dog clutch means 50 and an internal position, illustrated in FIGS. 4 and 5, in which the fork arm 66 engages on flats 68 formed at the rear end of the spindle 58, so as to prevent any rotation of the latter. In the latter position, the plate 52 occupies an angular position such that the dog clutch pins 54 are located in the less wide ends 60b of the dog clutch slots 60. Any actuation of the dog clutch means 50 for separating the air intake 14 and the engine 10 is then impossible. The fork arm 66 is supported and guided in its radial displacement by a support 70 fixed to the interior of the front, central body 48.

The control of the radial displacement of the fork arm 66 is ensured by a control shaft 72, which radially traverses the front, central body 48 and the outer casing 10a of the turbojet engine and whose end adjacent to the fork arm 66 is integral with the latter in translation and has a thread 72a screwed into the support 70. The end 72b of the control arm 72 located outside the outer casing 10a makes it possible to control the rotation of the shaft 72 with the aid of an appropriate tool. Under the effect of said rotation, the control shaft 72 is radially displaced in one or other direction as a result of the cooperation of its thread 72a with the support 70. Therefore radial displacements of the fork arm 66 are obtained.

It should be noted that the end 72b of the control shaft 72 prevents the closing of a hatch 74 formed on an outer bearing 76 of the turbojet engine for as long as the fork arm 66 does not completely overlap the flats 68 of the spindle 58. This feature provides visual safety for maintenance personnel.

The embodiment described in detail relative to FIGS. 2 to 6 can be subject to a number of variants without passing outside the scope of the invention. Thus, the member located to the front of the turbojet engine and vie which the thrust axially exerted by the engine is transmitted to the aircraft structure can be a member provided solely for this purpose and not forming part of the air intake. Furthermore, although the aircraft structure supporting the engine is generally an aircraft wing, it can also be another structural element such as the airframe.

With regards to the transmission of the thrust between the member pieced to the front of the turbojet engine and the aircraft structure supporting the latter, it can be brought about in a manner different from that described, e.g. by means of any swivelling connection eliminating the degrees of freedom in translation X, Y and Z and permitting all the rotations $R_x$, $R_y$ and $R_z$. In a comparable manner, the means described for suspending the engine and the air intake on the wing can also be in different forms, particularly if the thrust transmission member is not an air intake and if the aircraft structure supporting the engine is not an aircraft wing.

I claim:

1. Device for attaching a turbojet engine having a front, central, non-rotary body to an aircraft structure, said device comprising:

an air intake having an outer casing attached to said aircraft structure to the front of the turbojet engine and separated from the latter, by thrust transmission means; and a thrust transmission ball joint connecting a front end of the central body to the outer casing of the air intake, along a longitudinal axis of the turbojet engine, the outer casing being connected to the ball joint by said thrust transmission means.

2. Device according to claim 1, wherein the thrust transmission member is an air intake having an outer casing connected to the ball joint by a rigid structure and connected to the aircraft structure by thrust transmission means.

3. Device according to claim 2, wherein the thrust transmission means incorporates a horizontal ball joint fitted in an upper, central part of the outer casing and traversed by a bore receiving a shaft integral with the aircraft structure.

4. Device according to claim 2, wherein the outer casing of the air intake is connected to the aircraft structure in a same radial plane of the air intake close to the turbojet engine by means of two substantially vertical ball joint-equipped shackles and by one substantially horizontal ball joint-equipped shackle and, in the vicinity of a front end of the air intake, by one substantially vertical ball joint-equipped shackle.

5. Device according to claim 1, wherein, the turbojet engine having an outer casing, the latter is directly connected to the aircraft structure in the same radial plane of the turbojet engine by two substantially vertical ball joint-equipped shackles and by one substantially horizontal ball joint-equipped shackle.

6. Device according to claim 1, further comprising disconnectable connecting means associated with said ball joint between the front end of the central body of the turbojet engine and the thrust transmission member.

7. Device according to claim 6, wherein the disconnectable connecting means incorporate dog clutch means interposed between the ball joint and the front end of the central body of the turbojet engine.

8. Device according to claim 7 also incorporating means for locking the dog clutch means in a connected state.

9. Device according to claim 7 also incorporating translation means for displacing the ball joint along an axis substantially aligned with the longitudinal axis of the turbojet engine, between an assembly position and a disassembly position.

10. Device according to claim 9 also incorporating an unlockable security system normally preventing an actuation of the translation means when they occupy their assembly position.

* * * * *